March 28, 1944.　　　E. O. BENNETT　　　2,344,939
APPARATUS FOR WELDING PIPE SECTIONS
Filed Dec. 9, 1942

INVENTOR.
Edwin O. Bennett
BY
　　　ATTORNEY.

Patented Mar. 28, 1944

2,344,939

UNITED STATES PATENT OFFICE 2,344,939

APPARATUS FOR WELDING PIPE SECTIONS

Edwin O. Bennett, Ponca City, Okla., assignor to Continental Oil Company, Ponca City, Okla., a corporation of Delaware Application December 9, 1942, Serial No. 468,358

3 Claims. (Cl. 219—4)

This invention relates to improvements in process and apparatus for welding pipe sections and refers more particularly to a method of resistance welding pipe without the use of welding rods, gases or other necessary appurtenances usually employed in the uniting of pipe sections.

Practically all pipes lines laid within the last ten or fifteen years have been welded. Both gas and electricity have been used in the welding of such lines. All such welding has been done with the use of welding rods. The enormous amount of heavy fabrication for ships, guns, tanks and other war necessities has practically exhausted the supply of welding rods for general industrial welding work and a large amount of such work which is now badly needed has been curtailed.

In view of this situation, an important advantage of this invention is the welding of pipe sections without the use of extraneous metal. It also eliminates the use of acetylene gas and oxygen for heating the pipe to welding temperatures.

Another object is the elimination of "icicles" caused by torch welding which project into the pipe at the joints and hinder the passage of fluids or cleaning devices.

A further object is the attainment of welding temperatures which can be automatically maintained without the necessity of visual observation to determine when proper fusion temperatures have been reached.

The invention also eliminates the necessity of a large number of extraneous supplies necessary for torch welding and minimizes the transportation difficulties along the pipe line of such facilities.

The process also reduces the time required for making the welded joint, produces a more uniform union between the ends of the pipe section than can be made by torch welding, and reduces the number of operators and expense accompanying the more complicated operations of torch welding methods.

Other objects and advantages of my invention will be apparent during the course of the following description.

In the accompanying drawing which forms a part of the instant specification and is to be read in conjunction therewith and in which like reference numerals are used to indicate like parts in the various views.

Figure 1:
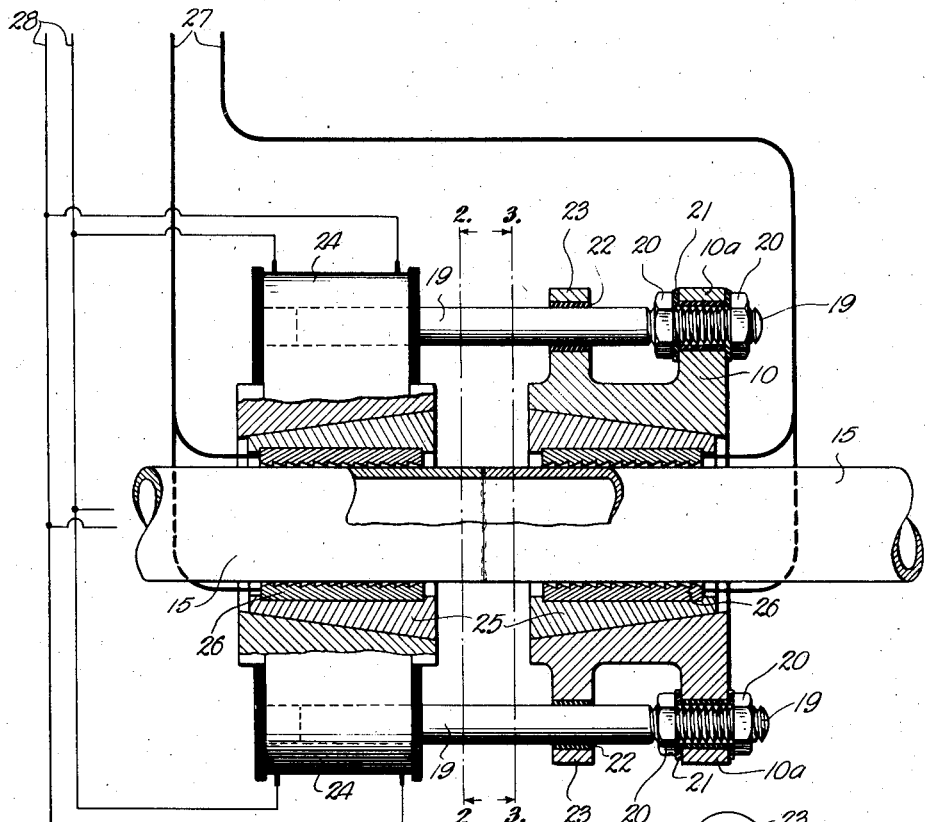
Fig. 1 is a side view principally in section of a device by means of which the process may be employed.
Figure 2:
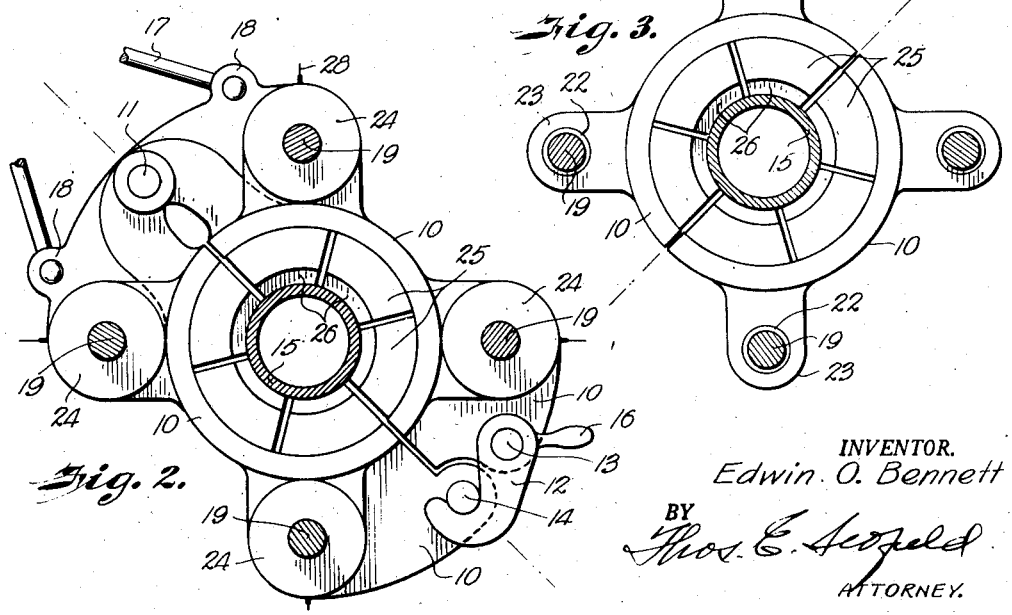
Fig. 2 is a view taken along the line 2—2 in Fig. 1 in the direction of the arrows.
Figure 3:
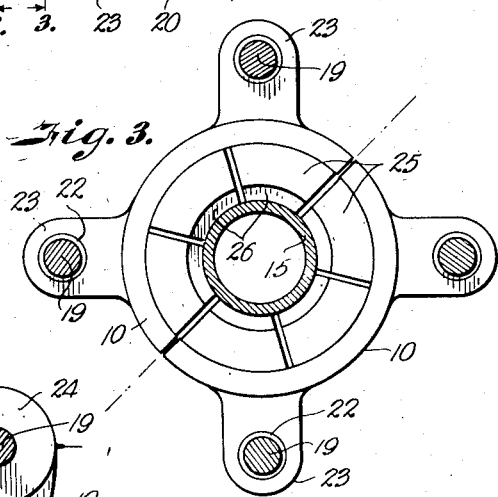
Fig. 3 is a view taken along the line 3—3 in Fig. 1 in the direction of the arrows.

Referring to the drawing, the welding device shown consists of two frame sections 10 which are hinged on a rod or shaft 11 and are fastened together at their opposite sides by means of latches 12. Latches 12 are pivoted at 13 to the frame sections and engage pins 14 to hold the sections in place around the ends of the pipe sections 15. Handles 16 facilitate manipulation of the latches in fastening the sections together.

At the top of sections 10 is a lifting yoke 17 attached to the frame sections at eyes 18 formed in the frame. To lugs 10a extending from the frame sections are affixed solenoid plungers 19 screw threaded at one end and held in place in said lugs by nuts 20. These plungers are insulated from the frame by bushings of insulating material 21. Similar bushings 22 insulate the lugs 23 from the bolts 19. The opposite ends of the plungers 19 are axially movable within solenoid coils 24. These solenoids are fixedly attached to and form a unitary part of one-half of the device.

As shown in Fig. 1, the device is in two parts connected by plungers 19, each part being hinged at 11 upon a rod or shaft in order that the sections can be opened or swung apart and placed around the ends of two abutting pipes. Mounted within the frame sections 10 are tapered bushings 25 which hold slips 26 in place by their wedging action. These slips are shaped to fit the cylindrical outer surface of the pipe and are serrated internally in order to grip the periphery of the pipe ends rigidly when the frame is latched together. The slips may be semi-cylindrical in shape or in a greater number of sections extending around a smaller arc of the circular cross section of the pipe. Connected to the slips are electric connections 27, which supply the welding current, and a separate electric circuit diagrammatically shown at 28 furnishes electrical energy to energize the solenoids 24.

The method employed in resistance welding the pipe ends is obvious from the construction of the device. It broadly comprises the aligning of sections of pipe to be united so that their squared ends are uniformly contacting. The two parts of the frame are so constructed that this aligning of the pipe sections automatically takes place when the frame sections are latched together. After the frame members have been rigidly latched and the pipe sections aligned with their ends abutting, a single phase current is passed into one of the pipe sections through slips 26 which surround one of the pipes and afford an electrical connection therewith. This current passes across the joint of the pipes and out through the abutting pipe, its gripping slips and electric connections supported in the opposite portion of the frame. The resistance of the joint being greater than any other part of the circuit immediately becomes heated. By increasing the current the temperature is rapidly raised at the joint to the fusion temperature of the metal.

Prior to the introduction of the current across the joint, an axial pressure of 150 to 400 pounds per square inch is exerted at the joint by energizing the solenoids 24. This causes an axial movement of the plungers 19 which draw the two parts of the device together. While solenoids have been shown, it is contemplated as well that this axial pressure or drawing together of the two parts surrounding the pipe ends may be exerted by other means such as hydraulic or compressed air pistons as well as by the electrically energized solenoids shown.

The current for heating and fusing the metal at the joint is continued until the metal temperature of each end of the pipe at the joint has reached a fusion temperature. When this temperature is reached additional axial pressure is applied, the heating current is discontinued and the joint is made.

The pressure which is used when pipe ends are united or when the weld is made is somewhat greater and considerably in excess of the pressure employed in making the initial contact at the joint during the period of initial heating and until the metal reaches the fusion point. In actual practice it has been found that the pressures necessary during the welding operation are approximately twice those used during the heating operation. The final pressure after welding is held for a brief period while the metal in the pipe cools, which forms a finished welded joint.

It will be noted from the drawing that the cage or frame which holds the gripping slips for the pipe ends is opened or hinged on a vertical axis passing diametrically through the pipe sections. The separation could be made with somewhat less convenience on a horizontal axis of the device.

It will be seen that I have accomplished the objects of my invention by the construction shown. It will be understood that certain features and sub-combinations are of utility and may be employed without reference to other features and sub-combinations. This is contemplated by and is within the scope of my claims.

It is further obvious that various changes may be made in details within the scope of my claims without departing from the spirit of my invention.

It is, therefore, to be understood that my invention is not to be limited to the specific details shown and described.

Having thus described my invention, I claim:

1. A butt-welding apparatus comprising a pair of frame sections adapted to be clamped on separate work pieces, a plurality of solenoids carried by one of said frame sections, plungers carried by the other of said frame sections extending therefrom and into said solenoids, and electrical connections for delivering current to the work pieces and for passing current through the solenoids.

2. A butt-welding apparatus comprising a pair of frame sections adapted to be clamped on separate work pieces, removable slips in the frame sections having serrated inner faces for gripping said work piece, a plurality of solenoids carried by one of said frame sections, plungers carried by the other of said frame sections extending therefrom and into said solenoids, and electrical connections for delivering current to the work pieces and for passing current through the solenoids.

3. A butt-welding apparatus comprising a pair of frame sections adapted to be clamped on separate work pieces, a plurality of free end plungers carried by and insulated from one of said sections, said plungers arranged to extend substantially parallel to said work pieces, solenoids carried by the other of said frame sections receiving the free ends of said plungers, and electrical connections for delivering current to the work pieces and for passing current through the solenoids.

EDWIN O. BENNETT.